W. A. TURBAYNE.
ELECTRICAL SYSTEM OF DISTRIBUTION.
APPLICATION FILED OCT. 16, 1908.
1,123,626.
Patented Jan. 5, 1915.
3 SHEETS—SHEET 1.
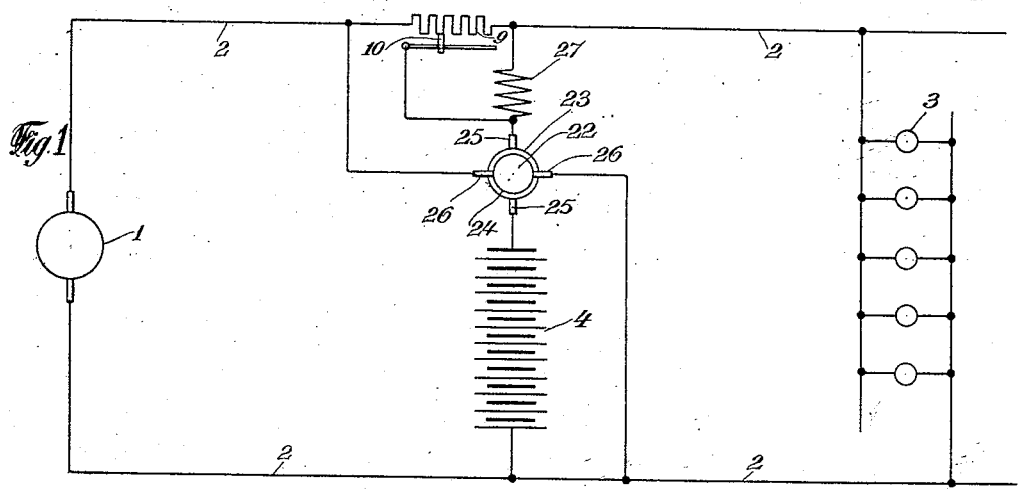
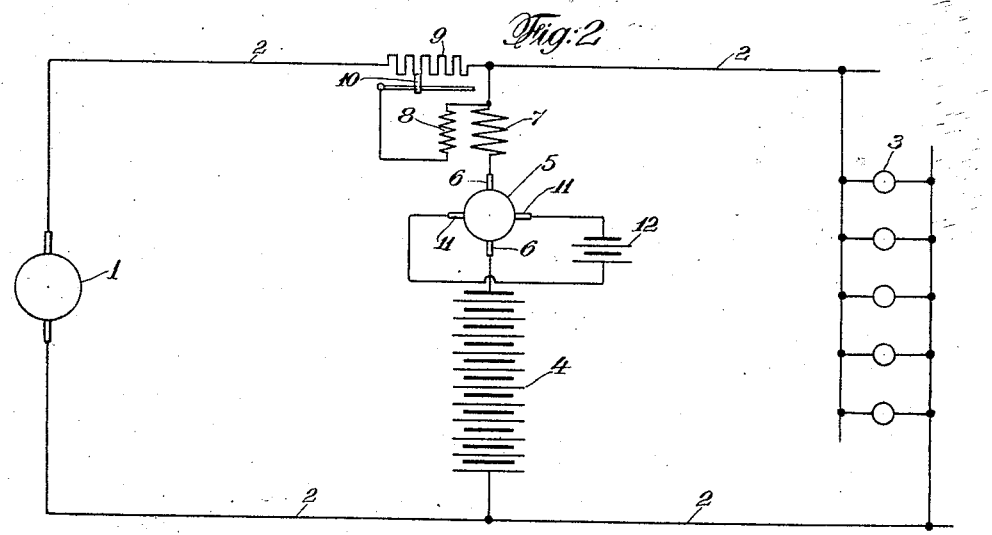
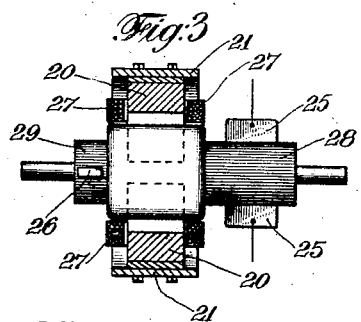
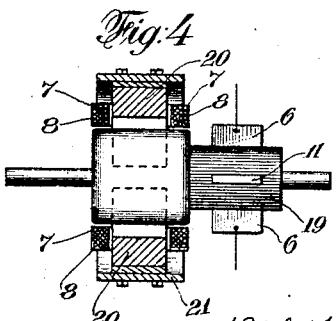
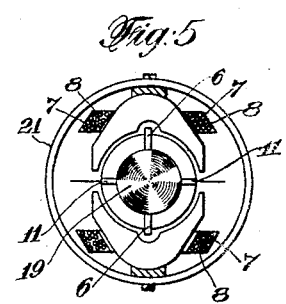
Witnesses:
Wm A. Turbayne Inventor
By his Attorneys Kenyon & Kenyon W. A. TURBAYNE.
ELECTRICAL SYSTEM OF DISTRIBUTION.
APPLICATION FILED OCT. 16, 1908.
1,123,626.
Patented Jan. 5, 1915.
3 SHEETS—SHEET 2.
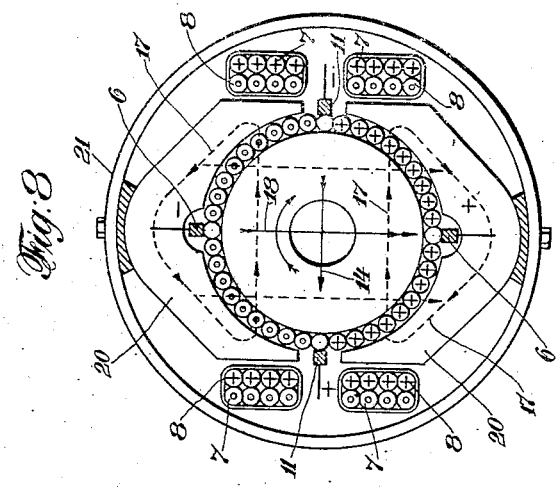
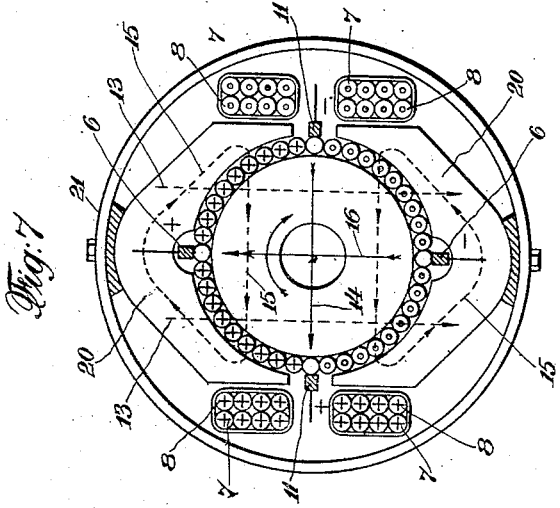
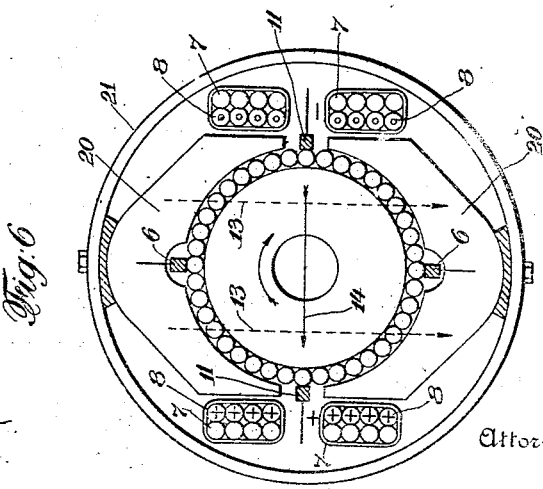

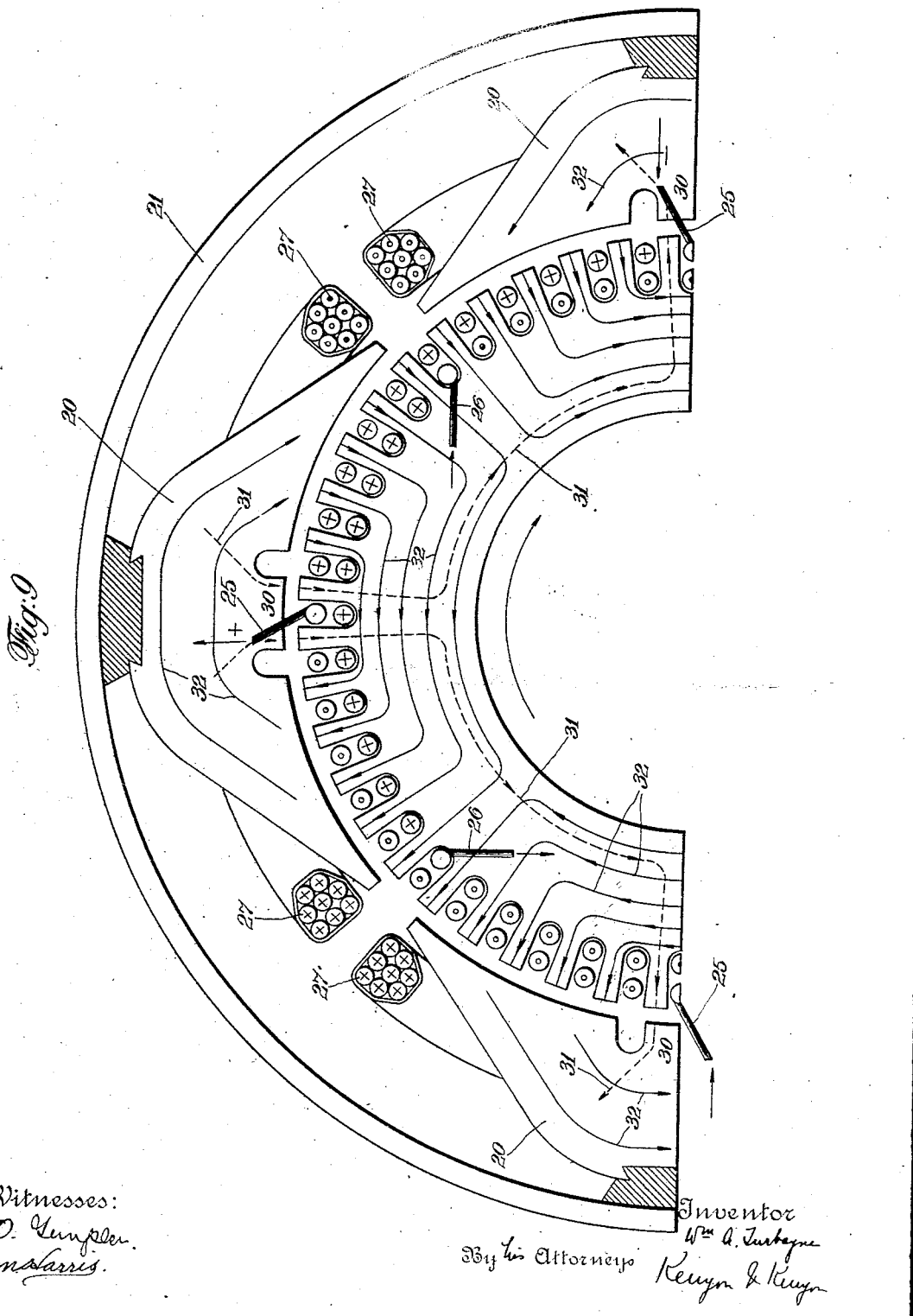

UNITED STATES PATENT OFFICE.

WILLIAM A. TURBAYNE, OF LANCASTER, NEW YORK, ASSIGNOR TO GOULD STORAGE BATTERY COMPANY, A CORPORATION OF NEW YORK.

ELECTRICAL SYSTEM OF DISTRIBUTION.

1,123,626.

Specification of Letters Patent.

Patented Jan. 5, 1915.

Application filed October 16, 1908. Serial No. 457,998.

*To all whom it may concern:*

Be it known that I, WILLIAM A. TURBAYNE, a citizen of the United States, and a resident of Lancaster, county of Erie, and State of New York, have invented certain new and useful Improvements in Electrical Systems of Distribution, of which the following is a specification.

My invention relates to electrical systems of distribution and has been more particularly devised with reference to systems employing a storage apparatus such as a storage battery and a booster for compensating for variations in electrical conditions of such systems so as to maintain the load on the central station or sub-station more steady.

My invention involves both an improvement in dynamos and also improvements in the arrangement and combination of parts of systems such as I have referred to.

Broadly speaking, the object of my invention is to supply a regulating dynamo and especially a battery booster that will be rapid in its response to the fluctuations occurring in the system while requiring a minimum of regulating apparatus.

Further objects, advantages and improvements will more clearly appear from the detail description given below taken in connection with the accompanying drawings which form a part of this specification.

In the drawings, Figure 1 represents diagrammatically a system embodying one form of my invention. Fig. 2 is a similar view showing a modification thereof. Fig. 3 is a sectional view of parts of the booster used in the system shown in Fig. 1. Fig. 4 is a similar view of the booster shown in Fig. 2. Fig. 5 is an end view of the booster shown in Fig. 4. Fig. 6 is a diagrammatical view of the booster shown in Fig. 4, showing the relationship of the armature and field conductors. Fig. 7 is a view similar to Fig. 6, but showing the direction of the exciting currents when the booster is aiding the battery. Fig. 8 is a similar view, but showing the direction of the exciting currents when the booster is opposing the battery. Fig. 9 is an enlarged, detail, diagrammatical view of the booster shown in Fig. 3, showing the relationship of the exciting and main armature currents.

Referring to Fig. 2, 1 represents a main generator feeding the circuit 2, 2, which supplies lamps or other translating devices 3. Across the circuit 2, 2, is connected the storage battery 4 and in series therewith the booster 5 arranged to cause the battery to discharge current to the line 2, 2, when it is overloaded and to generate a voltage opposing the battery to cause it to become charged when the load on the work or feed circuit falls below normal. The booster 5 is provided with main or working brushes 6, 6, which take off or conduct away the main armature current of the booster. In series with these brushes there are provided field turns 7 which have the same magnetic axis as the working armature conductors and produce a magneto-motive-force which opposes the magneto-motive-force set up by the main armature current in its working conductors. That is, the series winding 7 is so arranged that it tends to set up a flux that opposes the flux which tends to be set up by the main armature current. The winding 7 being in series with the working armature conductors its magneto-motive-force is proportional to that set up by the working armature current and thus effectively and efficiently compensates for armature reaction. 8 represents a second field coil the turns of which are wound parallel with the turns 7. The turns 8 are connected in shunt with a resistance 9 by means of an adjustable contact 10. The coil 8, therefore, carries a current proportional to the current supplied by the generator 1 and produces a magneto-motive-force in the same line as the turns 7. Both the working armature conductors and the turns 7 set up magneto-motive-forces which tend to produce electro-motive forces at the brushes 11, 11, but in opposite directions so that they oppose each other and substantially no difference of potential results at the brushes 11, 11, due to these windings. The turns 8, however, produce a further magneto-motive-force which produces a potential difference at the brushes 11, 11, responsive to variations in the current in the main generator, but produces no electro-motive force at the main brushes, 6, 6. This potential if unopposed will produce an exciting current in the armature conductors which will set up a flux to produce an electro-motive force at the main working brushes 6, 6. When the system is working under normal load, however, I oppose the potential difference produced by the coil 8 at the brushes 11, 11, by oppositely connecting to these brushes a source of substantially constant electro-motive force. This might be in the form of a battery 12 or any other convenient source of the proper value. When an increase in current occurs in the circuit 2, 2, the field coil 8 increases the electro-motive force produced thereby at the brushes 11, 11, so that it overcomes the electro-motive force produced by the source 12 and causes an exciting current to flow in the booster armature between these brushes, which sets up a flux therein to produce an electro-motive force at the brushes 6, 6, in the proper direction to cause the battery to discharge and take its share of the load. If a decrease in load on the system occurs the source 12 overcomes the electro-motive force produced by the field coil 8 and reverse operations take place to cause the battery to become charged from the circuit 2, 2.

The direction of flow of the exciting current and the various components of flux under different conditions will more clearly appear from Figs. 6, 7 and 8. In these figures the positive sign (+) indicates that the current flows into the conductor away from the eye and the negative sign (°) indicates that the current flows out of the conductor toward the eye. The currents represented are merely the exciting components of current and not the main working armature component of current. Fig. 6 represents the conditions when the load on the system is normal and no main working current flows through the booster armature. The flux set up by the turns 8 is shown by the dotted lines 13, 13, and produces an electro-motive force at the brushes 11, indicated by the arrow 14, in opposition to that set up by the source 12 which is indicated by the positive and negative marks. These two electro-motive forces being equal no exciting current results and no difference of potential at the brushes 6, 6, is produced. Fig. 7 represents conditions when the current in coil 8 increases above normal. The coil 8 then produces an increased flux represented by dotted lines 13, 13 which produces an increased electro-motive force in the direction of arrow 14, which overcomes the source 12 and causes an exciting current to flow in the armature between the brushes 11, 11, which sets up a flux indicated by dotted lines 15, 15, and which in turn produces an electro-motive force at the working brushes 6, 6, in the direction of the arrow 16, to cause a battery discharge. When a decrease in load occurs the source 12 prevails over the electro-motive force set up by the coil 8 and represented by the line 14 in Fig. 8. The exciting current now flows in the opposite direction between the brushes 11, 11, and sets up a working flux in the opposite direction indicated by the dotted lines 17, 17 in said Fig. 8. This produces an electro-motive force at the working brushes 6, 6, in the opposite direction as indicated by the arrow 18, to cause the battery to charge.

Figs. 4 and 5 show the arrangement of various of the parts of the booster shown in Fig. 2. The brushes 6, 6, 11, 11, are arranged about the commutator 19 at substantially ninety electrical degrees from each other. The turns 7 and 8 are secured about the field structures 20, 20, and the structures 20, 20, are secured in place by a magnetizable frame 21. The main polar regions of the booster 5 are at the brushes 11, 11, and in order to properly concentrate the main flux and to cut down the cross flux to the proper value, the field structures 20, 20 may be so arranged that the magnetic structure at each pole is split, forming two independent pole structures in each polar region, each magnetically separated from the other at this point, as far as the main working flux is concerned.

Referring to Fig. 1 the system there shown embraces a generator 1, circuit 2, 2, translating devices 3, and battery 4, similar to those shown in Fig. 2. The booster 22 is, however, somewhat different since it contains two independent armature windings represented by the circles 23 and 24. The main or working brushes 25, 25, connect the working or main armature conductors in series with the battery. The brushes 26, 26, connect the exciting windings, represented by the circle 24, across the circuit 2, 2. Also in this system the functions of the turns 7 and 8 of Fig. 2 are combined into one winding 27. The winding 27 is connected in series with the battery and booster to compensate for armature reaction and in shunt with the resistance 9 to give the booster the proper regulating excitation. A voltage at the brushes 26, 26, is produced in the winding 24 by the coil 27 equal to and opposing the substantially constant voltage applied to these brushes by the circuit 2, 2. In other respects the operation of the system shown in Fig. 1 is similar to the operation of the system shown in Fig. 2. Two armature windings are used in order to prevent the short-circuiting of the brushes 25 and 26, and to prevent an excess voltage being applied to the main working armature conductors.

Fig. 3 shows the arrangement of various parts of the booster used in the system shown in Fig. 1. The brushes 25 and 26 are arranged on independent commutators 28, and 29 respectively, and the field and compensating turns 27 are wound similarly to the turns 7 and 8.

Fig. 9 shows the relationship of the currents in the windings and the various components of flux when the booster of Fig. 1 is causing the battery to discharge. A four pole machine is, however, shown in which the field structures are provided with commutating lugs 30. The exciting turns are represented by the inner row of conductors and the main or working turns by the outer row of conductors. Although the exciting turns are shown as of the same number and size as the working turns, this is merely for illustrative purposes. In practice the exciting turns are formed into a much larger number of turns of smaller wire than the working turns, in order to obtain the proper number of ampere turns. The field turns 27 set up a component of flux represented by the dotted lines 31 which produces an electro-motive force at the brushes 26, 26, overcoming the substantially constant opposing source. This causes an exciting current to flow between the brushes 26, 26, causing a component of flux to be set up represented by the full lines 32 which in turn produces the proper potential difference at the main brushes 25. The positive (+) and negative (°) signs indicate the directions of the exciting and working currents under these conditions.

From the above it will be clear that I have not only provided a system in which all regulating machines, except the booster, have been eliminated, but have at the same time provided a novel form of booster which is exceptionally sensitive and quickly responsive to all line fluctuations, and one which provides exceptionally close regulation and in which the sluggishness due to hysteresis and other causes has been substantially removed.

Although I have described my improvements with great detail, I do not desire to be limited to such details, but, Having thus fully and clearly described my improvements, what I claim and desire to secure by Letters Patent, is:

1. In an electrical system of distribution, the combination with a circuit, a storage apparatus across the same, a booster therefor having field turns and an armature field excitation circuit, means for applying an electromotive force across said field excitation circuit, said field turns receiving a current responsive to given changes of the electrical condition of the system and being wound to generate an electromotive force in said excitation circuit opposing the said electromotive force applied across said field excitation circuit.

2. In an electrical system of distribution, the combination of a circuit, a storage apparatus connected thereto, and a booster in operative relation therewith, said booster being provided with field turns on its field structure wound to oppose its armature reaction and connected with the circuit to carry a current responsive to current variations in said circuit.

3. In an electrical system of distribution, the combination of a circuit, a storage apparatus connected thereto, a booster in operative relation therewith, said booster having an armature, means for taking off the current generated in said armature, means for applying a substantially constant potential to said armature, and said booster being provided with means for producing a variable potential in said armature in opposition to said constant potential.

4. The combination with a main generator, a storage apparatus, a booster therefor having an armature field excitation circuit, and means for applying an electro-motive force across said circuit, said booster having field turns, means to apply to said turns a current responsive to changes in the current output of said generator to generate an opposing electro-motive force in said excitation circuit.

5. In an electrical system of distribution, the combination of a feed circuit, a storage apparatus connected thereto, a booster in operative relation therewith, said booster having an armature, and means for applying a substantially constant potential to said armature, said booster having field turns for setting up a field in the booster to compensate for armature reaction and to produce an electromotive force in opposition to said potential.

6. In an electrical system of distribution, the combination of a feed circuit, a storage apparatus connected thereto, a booster in operative relation therewith, said booster being provided with armature turns, brushes for taking off the main armature current of the booster, brushes at substantially 90 electrical degrees from said first mentioned brushes, and means for applying a substantially constant electro-motive force at said last mentioned brushes, said booster having a field coil responsive to variations in the electrical condition of the system for setting up an electro-motive force in the booster in opposition to said last mentioned electromotive force.

7. In an electrical system of distribution, the combination of a feed circuit, a storage apparatus connected thereto, a booster in operative relation therewith, said booster being provided with armature turns, brushes for conducting the main armature current to and from the battery, brushes at 90 electrical degrees from said brushes, means for applying to the armature turns by said last mentioned brushes, a substantially constant electro-motive force, said booster having field turns for producing in the booster at said second mentioned brushes an electromotive force in opposition to said substantially constant electro-motive force, responsive to electrical changes in said circuit.

8. In an electrical system of distribution, the combination of a feed circuit, a storage apparatus connected thereto, a booster in operative relation therewith, and external means for applying an electro-motive force to the booster armature, said booster having a field coil connected to produce an electro-motive force in said armature responsive to variations in the electrical condition of the system, in opposition to said first mentioned electro-motive force.

9. In an electrical system of distribution, the combination of a feed circuit, a storage apparatus connected thereto, a booster in operative relation therewith provided with brushes for conducting the main armature current to and from the storage apparatus, and means for applying an electro-motive force to the booster armature, said booster being provided with a field structure provided with turns substantially all of which are connected to produce an electro-motive force at substantially 90 electrical degrees from said brushes responsive to variations of current in the feed circuit.

10. The combination of a main generator and a compensating storage battery therefor, a booster in the battery circuit with brushes for taking off the main armature current thereof, and means to energize the field magnets of the booster responsive to current changes in the battery and generator circuits, said means comprising field turns having a magnetic axis disposed to compensate for the armature reaction of the booster.

11. The combination of a distribution circuit, a compensatory storage battery therefor, a booster in the battery circuit having field magnet turns arranged to produce a flux responsive to variations in the currents of the distribution and battery circuits, which flux produces a current for exciting the booster to produce the boosting electro-motive force, and means for applying an electro-motive force to oppose the flow of said exciting current.

12. In an electrical system of distribution, the combination of a feed circuit, a storage battery connected across the same, a booster in series with the battery, said booster being provided with a field structure having turns with a magnetic axis parallel to that of its working armature turns, the current in said field windings being responsive to variations in the electrical condition of the system and means for applying an electro-motive force to the booster armature.

13. The combination with a circuit, a storage apparatus across the same, a booster therefor having two armature windings, one for the main current and the second to excite the main field, and means for applying an electro-motive force to said second winding, said booster being provided with means for generating an opposing electro-motive force in said second winding variable with given changes of the electrical condition of the system.

14. The combination of a main generator, a storage apparatus, a booster therefor having two sets of armature turns, one set being field excitation turns, and turns on the field magnet so disposed as to produce an electro-motive force in said set of field excitation turns, means for applying an opposing electro-motive force to the said field excitation turns, one of said opposing electro-motive forces being produced by connections whereby it varies responsively to load changes of said generator.

15. The combination of a main generator, a storage apparatus, a booster therefor having two sets of armature turns, one set being field excitation turns, and turns on the field magnet so disposed as to produce an electro-motive force in said set of field excitation turns, and means for applying an opposing electro-motive force to the field excitation turns, the turns on the field magnet being connected to carry a current responsively to load changes of said generator.

16. The combination of a main generator and a compensating storage battery therefor, a booster in the battery circuit having field magnet turns responsive to current changes in the battery and generator circuits, the booster armature having two sets of turns, one set being field excitation turns and itself disposed to generate an electro-motive force under the influence of the field magnet turns, and means for applying an electro-motive force from the generator to said field excitation turns.

17. The combination with a circuit, a storage apparatus across the same, and a booster therefor having two armature windings, one for the main current and the second to produce the main field, and means for generating an electro-motive force in said second winding responsive to current changes in said circuit.

18. The combination of an electrical supply circuit, a compensatory storage battery therefor, and a regulating dynamo for controlling or regulating the charge and discharge of the battery, said dynamo being provided with two sets of armature turns, and with field turns on its field structure to compensate for armature reaction and arranged to produce an exciting current in one set of armature turns responsive to load changes on said circuit, which exciting current will produce an electro-motive force in the other set of armature turns.

19. The combination of an electrical circuit, a compensatory storage battery therefor, and a regulating dynamo for the battery, having two sets of armature turns, field turns on the dynamo to produce an exciting current in one set of armature turns responsive to load changes on said circuit and said second set of armature turns having the regulating electro-motive force produced therein by said exciting current.

20. In an electrical system of distribution the combination of a feed circuit, a storage battery connected thereto, a regulating dynamo for the storage apparatus, said dynamo having field turns on its field structure responsive to electrical variations in the circuit substantially all of which turns produce a magneto-motive force in the same line as that produced by its working armature conductors and means for applying an electro-motive force to the armature of said dynamo.

In testimony whereof, I have signed my name to this specification, in the presence of two subscribing witnesses.

WILLIAM A. TURBAYNE.

Witnesses:
THOS. DOBBINS,
W. H. PATTENDEN.

---

Correction in Letters Patent No. 1,123,626.

It is hereby certified that in Letters Patent No. 1,123,626, granted January 5, 1915, upon the application of William A. Turbayne, of Lancaster, New York, for an improvement in "Electrical Systems of Distribution," an error appears in the printed specification requiring correction as follows: Page 1, line 100, for the word "windings" read *turns;* and that the said Letters Patent should be read with this correction therein that the same may conform to the record of the case in the Patent Office.

Signed and sealed this 16th day of February, A. D., 1915.

[SEAL.]

J. T. NEWTON,

*Acting Commissioner of Patents.*